(12) United States Patent
Pienta et al.

(10) Patent No.: US 8,160,748 B2
(45) Date of Patent: Apr. 17, 2012

(54) METHOD AND APPARATUS FOR REMOVING WIRES FROM A BALE

(75) Inventors: Daniel J. Pienta, Lambertvile, MI (US); David M. Pienta, Lambertville, MI (US)

(73) Assignee: Automatic Handling International, Erie, MI (US)

(*) Notice: Subject to any disclaimer, the term of this patent is extended or adjusted under 35 U.S.C. 154(b) by 527 days.

(21) Appl. No.: 12/380,131

(22) Filed: Feb. 24, 2009

(65) Prior Publication Data

US 2009/0211073 A1 Aug. 27, 2009

Related U.S. Application Data

(60) Provisional application No. 61/067,203, filed on Feb. 26, 2008.

(51) Int. Cl.
*G05B 19/00* (2006.01)
*B23P 19/02* (2006.01)

(52) U.S. Cl. ............... 700/259; 29/426.4; 901/47

(58) Field of Classification Search ............ 29/426.4, 29/564.3; 700/259; 901/47, 41; 83/909
See application file for complete search history.

(56) References Cited

U.S. PATENT DOCUMENTS

| | | | | |
|---|---|---|---|---|
| 6,393,688 B1 * | 5/2002 | Axner | ............ | 29/564.3 |
| 7,152,634 B2 * | 12/2006 | Peters et al. | ............ | 140/102 |
| 2006/0019590 A1 * | 1/2006 | Ilch et al. | ............ | 452/130 |

* cited by examiner

*Primary Examiner* — John C Hong
(74) *Attorney, Agent, or Firm* — Emch, Schaffer, Schaub & Porcello Co., LPA

(57) ABSTRACT

A method and apparatus for removing wires from a bale includes a conveyor system for moving one or more bales and a de-wiring station positioned adjacent the conveyor system. The de-wiring station includes a robot with an end tool. A bale that is bound by one or more wires is transferred by the conveyor system to a position proximate the de-wiring station. The robot with end tool moves to sense the location of the wires, cut the wires, collect the wires and deposit the wires in a collection hopper.

11 Claims, 5 Drawing Sheets

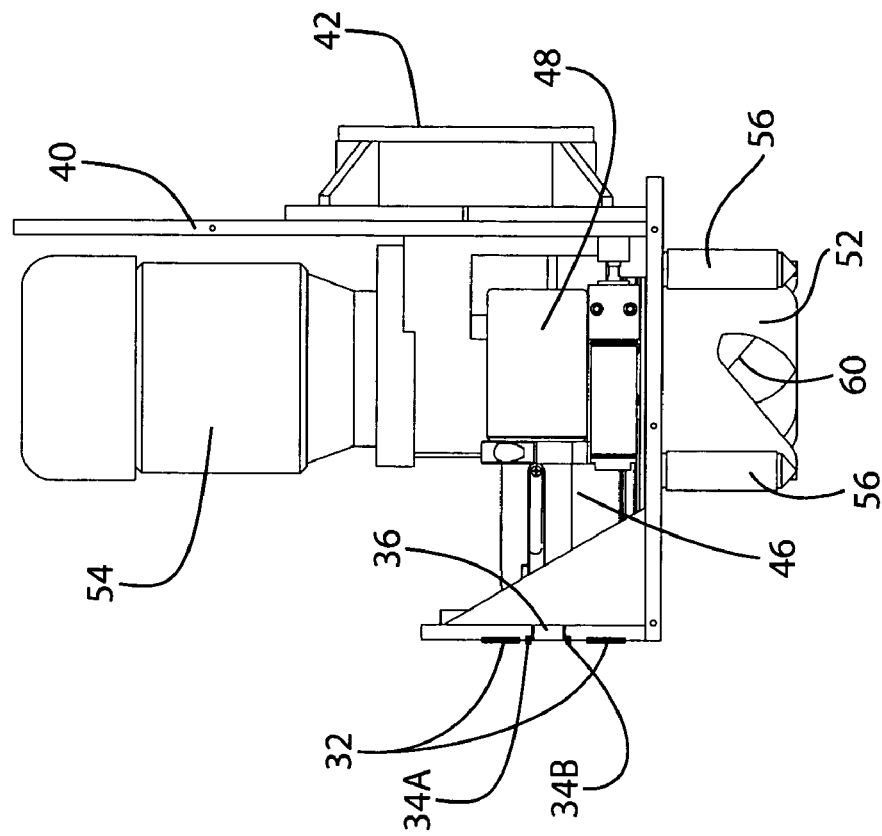
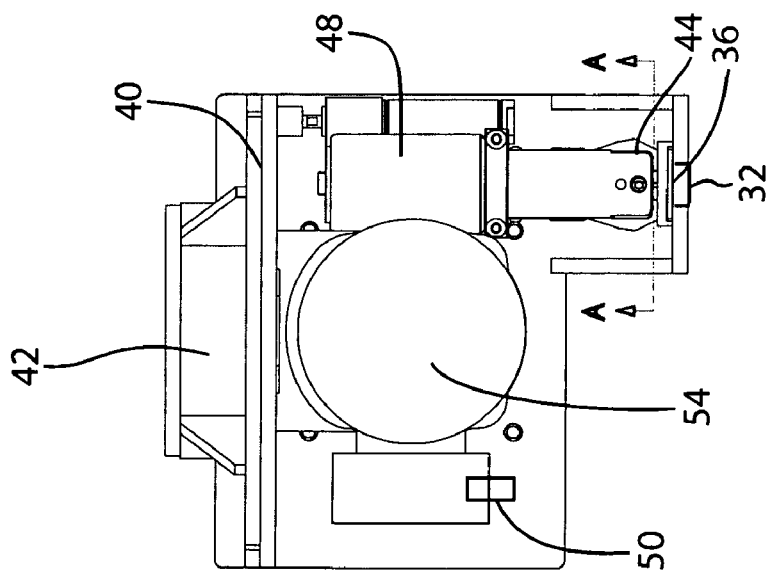

METHOD AND APPARATUS FOR REMOVING WIRES FROM A BALE

CROSS REFERENCE TO RELATED APPLICATION

This application is a conversion of U.S. provisional patent application Ser. No. 61/067,203, filed Feb. 26, 2008.

TECHNICAL FIELD

The invention relates generally to a method and apparatus for removing wires from a bale of material.

BACKGROUND OF THE INVENTION

Raw material, intended for manufacture, is often transported and presented for manufacture in bales. A prime example is the presentation of pulp paper material, in a bale bound by wire, intended for use in the manufacture of various paper products. When the bale bound by wire reaches the manufacturing setting the wire is usually manually clipped and removed from the bale. Such a manual process presents inefficiencies and a potential for injury to workers. The worker must use a sharp cutting tool and remove the cut wires from the bales, depositing those wires in a storage bin. Many times the metal wires are under tension and if the worker is not careful, the wires may snap away from the bale upon being cut.

Therefore, there is a need for an automated system for removing the metal wires from a bale, thus, eliminating any potential for injury to a worker.

There is further a need for an automatic system for removing wires from a bale in a timely and efficient manner.

SUMMARY OF THE INVENTION

The invention is a method and apparatus for removing wires from a bale. The invention includes, among other things, a robot having a full range of movement on three planes. The robot carries an end tool which comprises a vision system used to locate the wire and a cutting tool for cutting the wire. The end tool further includes a wire collecting spindle which removes the cut wires from the bale. The robot transports the wires to a hopper and the wire collecting spindle deposits the wires in the hopper.

The apparatus includes a conveyor system for moving one or more bales and a de-wiring station positioned adjacent the conveyor system. The de-wiring station includes the robot with end tool. A bale that is bound by one or more wires is transferred by the conveyor system to a position proximate the de-wiring station. The robot with end tool then moves to sense the location of the wires, cut the wires, collect the wires and deposit the cut wires in a collection hopper. The de-wired bale is then moved by the conveyor system to manufacturing and another wire bound bale is moved proximate to the de-wiring station.

BRIEF DESCRIPTION OF THE DRAWINGS

FIG. 6 is a top view of the end tool.

FIG. 7 is a side elevation view of the end tool.

DETAILED DESCRIPTION OF THE PREFERRED EMBODIMENT

Figure 2:
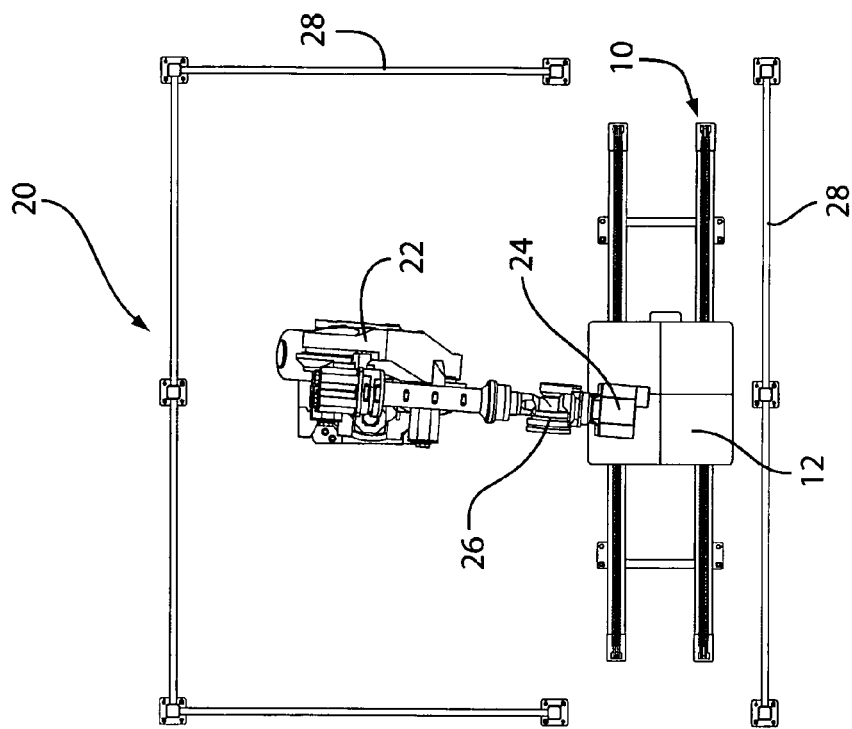
FIG. 2 is a top view of the de-wiring station, also showing the protective fencing around the de-wiring station.
Figure 1:
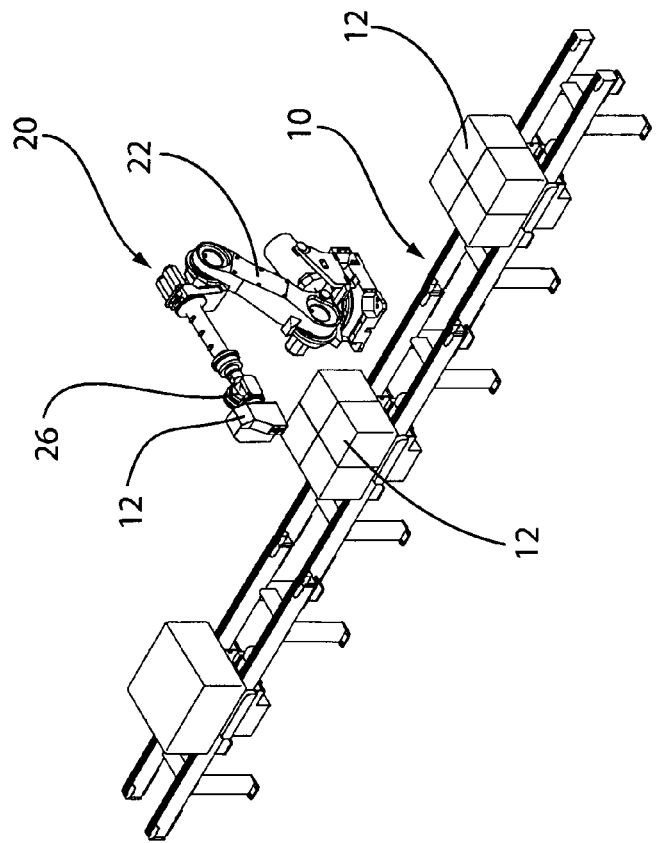
FIG. 1 is a perspective view of the apparatus of the invention showing the conveyor system and de-wiring station with robot and end tool.

Referring to FIGS. 1 and 2, the overall apparatus for de-wiring a bale is shown in detail. The system includes a conveyor mechanism 10 designed to carry bales of paper pulp 12 or other bound materials past a de-wiring station 20 comprising an industrial robot 22 designed to have a full range of motion in three planes. An end tool 24 is carried by the industrial robot 22 on its distal wrist 26. In the operational environment, the de-wiring station 20 will have a fence 28, as shown in FIG. 2, around the motion area of the robot 22 as a safety precaution in the work place.

Figure 3:
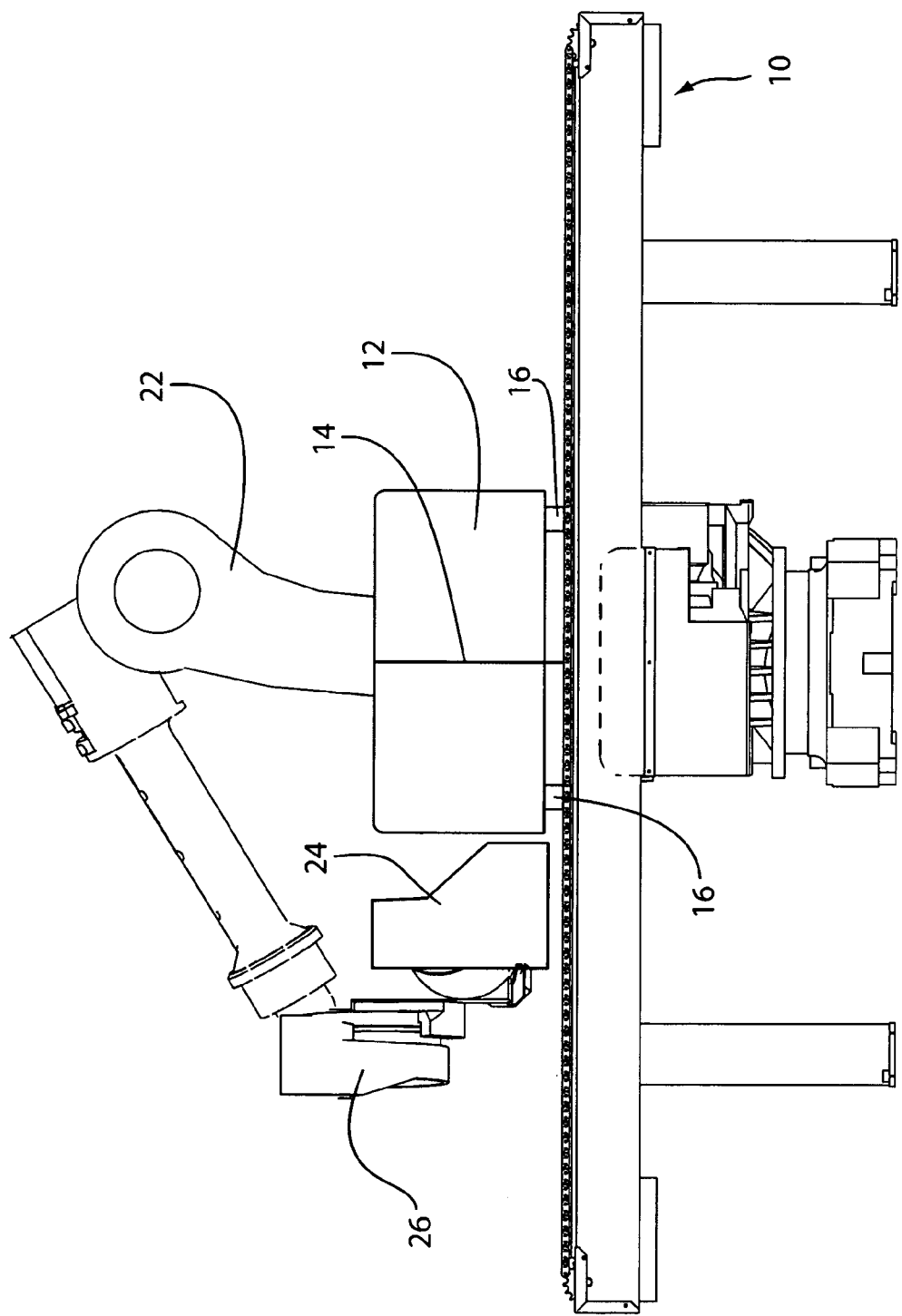
FIG. 3 is a front elevation view of the apparatus of the invention with the end tool in position to cut a wire.

Referring now to FIG. 3, when the wired bale 12 is in position proximate the de-wiring station 20, the bale 12 is lifted off of the conveyor 10 by pop-up cylinders 16 or an inflatable air bag or a similar elevation device. Elevating the bale 12 removes the wires 14 from contact with the conveyor 10. The robot 22 will locate the wires 14 on the lower sides of the bale 12 and perform the clipping operation of the wires at that location. The bottom portion of the clipped wire 14 will fall downward through the conveyor 10 to a hopper (not shown). The upper portion of the clipped wires 14 will be gathered by the wire spindle, to be described in detail later, and the robot 22 will move to deposit the gathered clipped wires into a hopper (not shown) elsewhere in the de-wiring station.

Figure 5:
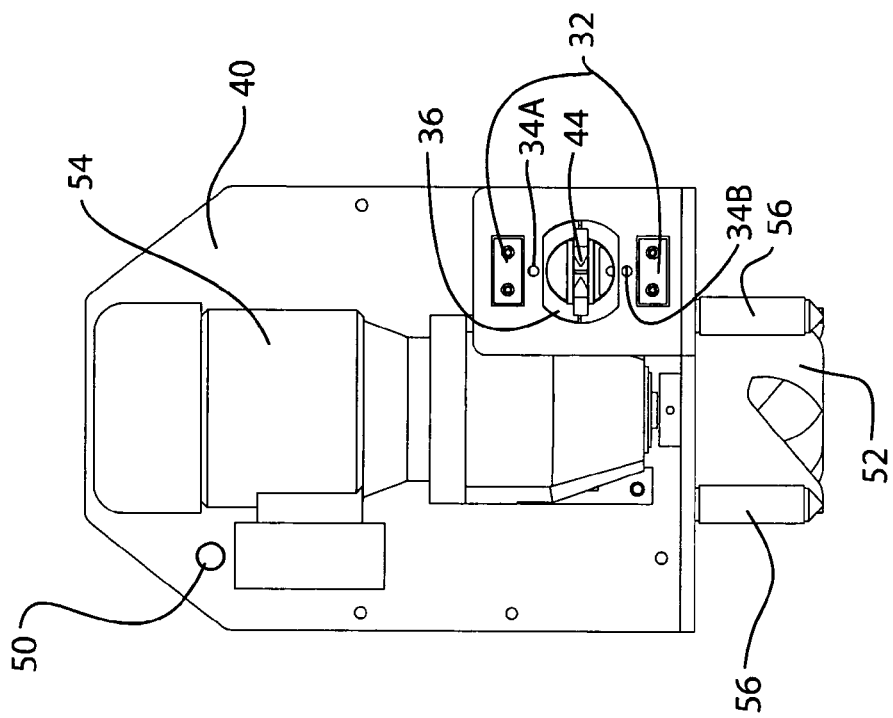
FIG. 5 is a front elevation view of the end tool.
Figure 4:
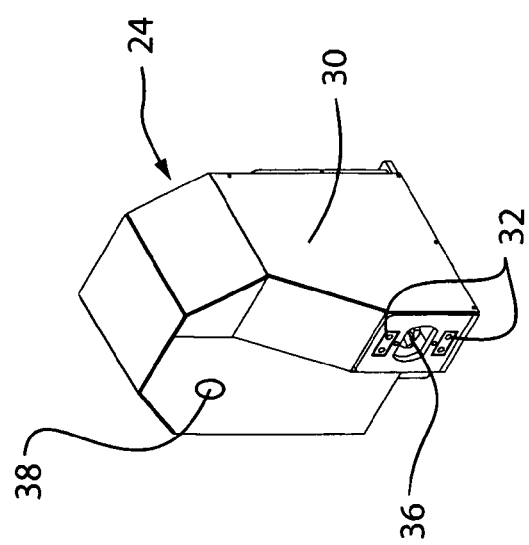
FIG. 4 is a perspective view of the end tool.

Referring to FIGS. 4-6 the end tool 24 is shown in detail. The end tool 24 includes a housing 30 as shown in FIG. 4. Located in the housing 30 is camera opening 38. The front of the end tool carries bumper pads 32 and upper and lower sensors-34A, 34B. Located in between the sensors 34A-B, is clipper opening 36.

Referring now to FIGS. 5-7, the end tool is shown in detail with the housing 30 removed. The end tool has a frame 40 which supports the various components of the end tool. The frame 40 is attached to the wrist 26 of the robot 22 by carriage 42. A cutting tool 44 is located in the clipper opening 36 and, at rest, is retracted within the clipper opening 36. The cutting tool 44 is engaged with a linear rail carriage 46. The linear rail carriage is attached to cylinder 48. As the cylinder 48 is activated the linear rail carriage 46 moves the cutting tool 44 into cutting position wherein it is extended outward through the clipper opening 36. After the cutting of the wires is accomplished, the cylinder 48 retracts the linear rail carriage 46 and pulls the cutting tool 44 back into the opening 36. With the cutting tool 44 retracted, there is no possibility of inadvertent snagging or cutting of material or operator. The end tool 24 also carries a camera 50 which operationally visions the bale and assists in positioning the end tool.

Figure 8:
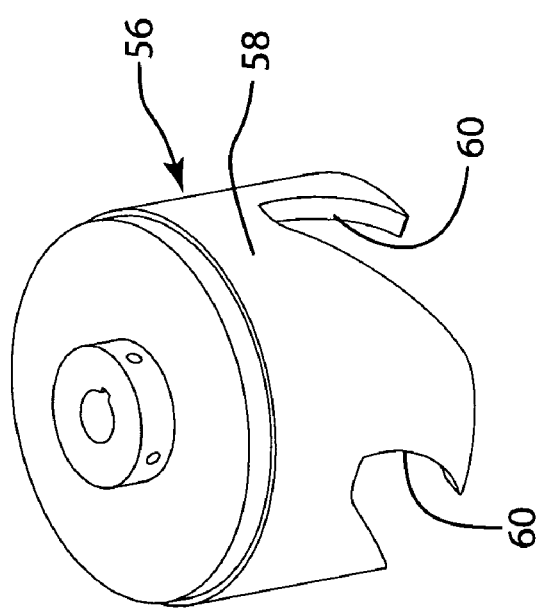
FIG. 8 is a perspective view of the wire collecting spindle.

The end tool further carries wire collecting spindle 52 which is driven by motor 54. Four wire guide pins 56 are located in close proximate position to the spindle 52 and extend to the lower most point of the spindle 52. Referring to FIG. 8, the spindle is composed of a circular pipe-like casing 58 having four slots 60 positioned at 90° orientation cut into the casing 58.

In operation, a bale bound by wires is positioned in front of the de-wiring station as shown in FIG. 2. As shown in FIG. 3 the robot uses its visioning system through its camera to locate the wires on the sides of the bale. Once the end tool is positioned along the wire on the sides of the bale the sensors locate the wire and the robot extends the end tool into engagement with the bale. The wire is pinned against the bale by the bumper pads. The cylinder activates the linear rail carriage extending the cutting tool into engagement with the wire. The cutting tool then cuts the wire and the cylinder retracts the cutting tool back into the clipper. The engagement of the bumper pads with the wire and the bale prevents the wire from springing and releasing away from the bale.

Once both wires are cut, the visioning system orients the end tool to the top of the bale and the robot lowers the end tool to the bale until the guide pins engage the top surface of the bale. The motor is then activated and the spindle turns gathering the clipped wires into the slots rotating the wires up into the internal cavity of the spindle. Once the wires are removed the robot locates the wire hopper and the motor is reversed thus disgorging the clipped wires from the spindle.

While the invention has been described with reference to particular embodiments, it should be understood that various changes may be made and equivalence substituted for elements thereof without departing from the essential scope of the invention. In addition, many modifications may be made to adapt to a particular situation or material to the teachings of the invention without departing from the essential scope. Therefore, it is intended that the invention not be limited to the particular embodiments described but that the invention shall include all embodiments falling within the scope of the claims.

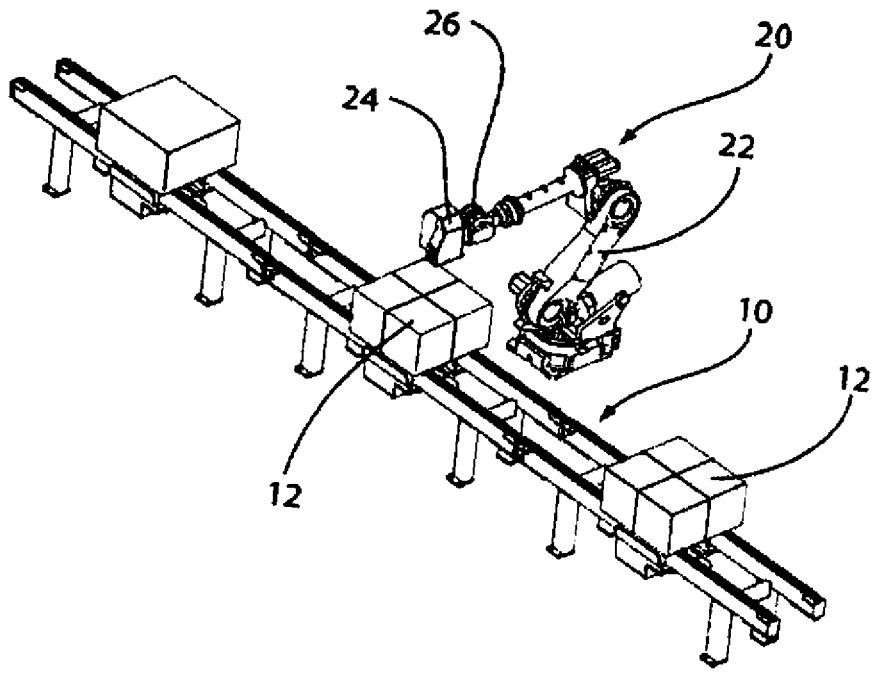

We claim:

1. An apparatus for removing wires from a bale comprising a robot having a full range of movement in three planes; an end tool positioned on the distal end of the robot, said end tool including a housing having (1) a visioning system with at least one camera for locating the wires on the bale and (2) a wiring cutting tool, wherein, upon the visioning system locating the wires, the robot places the cutting tool proximate the wires, and the cutting tool clips the wires, thereby allowing the wires to be removed from the bale.

2. The apparatus of claim 1 wherein said housing includes at least two sensors for locating the wire and instructing the robot to position the cutting tool proximate the wire.

3. The apparatus of claim 2 wherein the end tool further includes at least two bumper pads, each bumper pad located proximate the sensor where in the bumper pads engage the wire and hold the wire against the bale as the cutting tool clips the wire.

4. The apparatus of claim 1 wherein the cutting tool is retractable within the end tool when not in use clipping wires.

5. The apparatus of claim 1 wherein the end tool further includes a wire collecting spindle for removing the wires from the bale, said spindle being rotatable in a first direction to collect the clipped wires and in a second direction to disgorge the clipped wires from the spindle.

6. The apparatus of claim 5 wherein said wire collecting spindle has a circular pipe-like casing for receiving said wire while rotating in said first direction.

7. The apparatus according to claim 6 further including a plurality of guide pins adjacent said spindle.

8. The apparatus of claim 5 wherein said pipe-like casing has a plurality of slots at a lower most portion of said spindle.

9. An apparatus for removing wire from bales comprising a robot having a full range of movement in three planes; an end tool positioned on the distal end of the robot, said end tool including housing having (1) a visioning systems with at least one camera for locating the wire on the bale, (2) a wire cutting tool, and (3) at least two bumper pads, said bumper pads positioned to engage the wire and hold the wire against the bale as the cutting tool clips the wire, wherein, upon the visioning system locating the wire, the robot places the cutting tool proximate the wire, and the cutting tool clips the wire, thereby allowing the wire to be removed from the bale, a wire collecting spindle for removing the wire from the bale, said spindle being rotatable in a first direction to collect the clipped wire and in a second direction to disgorge clipped wire from the spindle.

10. The apparatus of claim 9 wherein the cutting tool includes at least two sensors for locating the wire and instructing the robot to position the cutting tool proximate the wire.

11. The apparatus of claim 9 wherein the cutting tool is retractable within the end tool when not in use clipping wires.

* * * * *

UNITED STATES PATENT AND TRADEMARK OFFICE
CERTIFICATE OF CORRECTION

PATENT NO. : 8,160,748 B2
APPLICATION NO. : 12/380131
DATED : April 17, 2012
INVENTOR(S) : Daniel J. Pienta et al.

Page 1 of 2

It is certified that error appears in the above-identified patent and that said Letters Patent is hereby corrected as shown below:

Title page should be deleted and substitute therefor the attached title page.

In the Drawings

In Fig. 1, the end tool was mislabeled as "12", this should be -- 24 --. (As shown below)

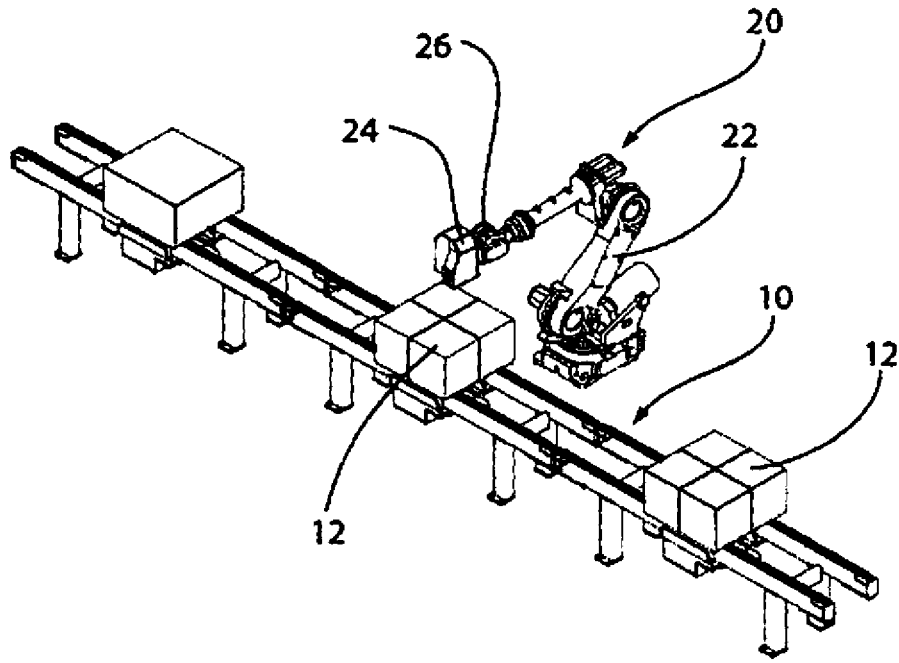

Signed and Sealed this
Fourth Day of March, 2014

Michelle K. Lee
*Deputy Director of the United States Patent and Trademark Office*

(12) United States Patent
Pienta et al.

(10) Patent No.: US 8,160,748 B2
(45) Date of Patent: Apr. 17, 2012

(54) METHOD AND APPARATUS FOR REMOVING WIRES FROM A BALE

(75) Inventors: Daniel J. Pienta, Lambertvile, MI (US); David M. Pienta, Lambertville, MI (US)

(73) Assignee: Automatic Handling International, Erie, MI (US)

( * ) Notice: Subject to any disclaimer, the term of this patent is extended or adjusted under 35 U.S.C. 154(b) by 527 days.

(21) Appl. No.: 12/380,131

(22) Filed: Feb. 24, 2009

(65) Prior Publication Data
US 2009/0211073 A1  Aug. 27, 2009

Related U.S. Application Data

(60) Provisional application No. 61/067,203, filed on Feb. 26, 2008.

(51) Int. Cl.
*G05B 19/00* (2006.01)
*B23P 19/02* (2006.01)

(52) U.S. Cl. ............... 700/259; 29/426.4; 901/47

(58) Field of Classification Search ........... 29/426.4, 29/564.3; 700/259; 901/47, 41; 83/909
See application file for complete search history.

(56) References Cited

U.S. PATENT DOCUMENTS

| | | | |
|---|---|---|---|
| 6,393,688 B1 * | 5/2002 | Axner | 29/564.3 |
| 7,152,634 B2 * | 12/2006 | Peters et al. | 140/102 |
| 2006/0019590 A1 * | 1/2006 | Ilch et al. | 452/130 |

* cited by examiner

*Primary Examiner* — John C Hong
(74) *Attorney, Agent, or Firm* — Emch, Schaffer, Schaub & Porcello Co., LPA

(57) ABSTRACT

A method and apparatus for removing wires from a bale includes a conveyor system for moving one or more bales and a de-wiring station positioned adjacent the conveyor system. The de-wiring station includes a robot with an end tool. A bale that is bound by one or more wires is transferred by the conveyor system to a position proximate the de-wiring station. The robot with end tool moves to sense the location of the wires, cut the wires, collect the wires and deposit the wires in a collection hopper.

11 Claims, 5 Drawing Sheets